(12) United States Patent
Bao et al.

(10) Patent No.: US 7,171,559 B1
(45) Date of Patent: Jan. 30, 2007

(54) METHOD OF EXCHANGING DIGITAL DATA

(75) Inventors: Feng Bao, Singapore (SG); Huijie Deng, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 569 days.

(21) Appl. No.: 09/623,488

(22) PCT Filed: Mar. 18, 1998

(86) PCT No.: PCT/SG98/00020

§ 371 (c)(1),
(2), (4) Date: Oct. 30, 2000

(87) PCT Pub. No.: WO99/48243

PCT Pub. Date: Sep. 23, 1999

(51) Int. Cl.
*H04L 9/00* (2006.01)

(52) U.S. Cl. .................................. 713/169
(58) Field of Classification Search ............... 713/169, 713/150
See application file for complete search history.

(56) References Cited

U.S. PATENT DOCUMENTS

| | | | | | |
|---|---|---|---|---|---|
| 4,868,877 | A | * | 9/1989 | Fischer | 380/25 |
| 4,995,082 | A | * | 2/1991 | Schnorr | 380/23 |
| 5,218,637 | A | * | 6/1993 | Angebaud et al. | 380/23 |
| 5,231,668 | A | * | 7/1993 | Kravitz | 380/28 |
| 5,475,757 | A | * | 12/1995 | Kelly | 380/24 |
| 5,606,617 | A | * | 2/1997 | Brands | 380/30 |
| 5,666,420 | A | * | 9/1997 | Micali | 380/30 |
| 5,761,305 | A | * | 6/1998 | Vanstone et al. | 380/21 |
| 5,850,443 | A | * | 12/1998 | Van Oorschot et al. | 380/21 |
| 6,047,242 | A | * | 4/2000 | Benson | 702/35 |
| 6,125,445 | A | * | 9/2000 | Arditti et al. | 713/169 |
| 6,134,326 | A | * | 10/2000 | Micali | 380/30 |

(Continued)

FOREIGN PATENT DOCUMENTS

EP  0328232  8/1989

(Continued)

OTHER PUBLICATIONS

Article entitled "A Randomized Protocol for Signing Contracts", by Even et al., Communications of the ACM, vol. 28, No. 6, Jun. 1985, pp. 637-647.

(Continued)

*Primary Examiner*—Nasser Moazzami
*Assistant Examiner*—Pramila Parthasarathy
(74) *Attorney, Agent, or Firm*—Greenblum & Bernstein, P.L.C.

(57) ABSTRACT

Party A encrypts unique first digital data and generates an authentication certificate authenticating that the encrypted first data is an encryption of the first data. Party B verifies the encrypted first data using the authentication certificate. When the encrypted first data is verified by B, A verifies second unique digital data received from B. When the second data is verified by A, B verifies unencrypted first data received from A. When the unencrypted first data is not verified by B, B sends the encrypted first data and the second data to party C. C decrypts the encrypted first data to obtain the decrypted first data, and verifies the decrypted first and the second data. When the decrypted first and the second data are verified, C sends the decrypted first data to B and the second data to A.

11 Claims, 4 Drawing Sheets

U.S. PATENT DOCUMENTS

| | | | | |
|---|---|---|---|---|
| 6,137,884 A | * | 10/2000 | Micali | 380/30 |
| 6,154,543 A | * | 11/2000 | Baltzley | 380/255 |
| 6,178,507 B1 | * | 1/2001 | Vanstone | 713/169 |

FOREIGN PATENT DOCUMENTS

| | | |
|---|---|---|
| EP | 0578059 | 1/1994 |
| WO | 93/03562 | 2/1993 |
| WO | 96/02993 | 2/1996 |

OTHER PUBLICATIONS

Article entitled "How to Simultaneously Exchange Secrets by General Assumptions", by Okamoto et al., Proceedings of the 2nd ACM Conference on Computer Communications Security, Nov. 1994, pp. 184-192.

Article entitled "A Fair Non-repudiation Protocol", by Zhou et al., Proceedings of the 1996 IEEE Symposium on Security and Privacy, IEEE Computer Press, pp. 55-61.

Article entitled "Practical Protocols for Certified Electronic Mail", by Deng et al., Journal of Network and Systems Management, vol. 4, No. 3, 1996, pp. 279-297.

Article entitled "Optimistic Protocols for Fair Exchange", Asokan et al., Proceedings of the 4th ACM Conference on Computer and Communications Security, Apr. 1997, pp. 6-17.

"Cryptography and Data Security", by Denning, Addison-Wesley Publishing Company, 1983, pp. 169-171.

"Network Security—Private Communication in a Public World", by Kaufman et al., PTR Prentice Hall, 1985, pp. 48-52; 145-147; and 240-241.

Article entitled "Fair Exchange with a Semi-Trusted Third Party", by Franklin et al., Proceedings of the 4th ACM Conferences on Computer and Communications Security, Apr. 1-4, 1997, pp. 1-5.

Article entitled "The S/Key One-Time Password System" by Haller, Proceedings of the Internet Society Symposium on Network and Distributed Systems, 1994, pp. 1-7.

Article entitled "PayWorld and MicroMint: Two Simple Micropayment Schemes", by Rivest et al., RSA CryptoBytes, Apr. 27, 2001, pp. 1-18.

An article entitled "How To Time-Stamp a Digital Document", by Haber et al., Journal of Cryptology, 3(2), 1991, pp. 99-111.

Article entitled "A Public Key Cryptosystem and a Signature Scheme Based on Discrete Logarithms", by Elgamal, IEEE Transactions on Information Theory, vol. IT-31, No. 4, Jul. 1985, pp. 469-472.

Article entitled Digital Signature Standard (DSS), U.S. Department of Commerce/National Institute of Standards and Technology, Jan. 27, 2001.

Article entitled "Publicly Verifiable Secret Sharing", by Stadler, Proceedings of Eurocrypto '96, KNCS 1070, 1996, pp. 190-199.

"Smart Card—A Standardized Security Device Dedicated to the Public Cryptology", by Guillou et al., Contemporary Cryptology—The Science of Information Integrity, Chapter 12, IEEE Press, 1992, pp. 561-614.

"Network and Internetwork Security Principles and Practice", by Stallings, Prentice Hall, 1995.

\* cited by examiner

METHOD OF EXCHANGING DIGITAL DATA

The invention relates to digital data exchange and electronic commerce, and in particular, to a method of fair and efficient exchange of digital data between potential distrustful parties over a digital communication channel.

An important issue in information processing and electronic commerce is how to exchange non-repudiation information between two potentially distrustful parties in a secure and fair manner. An example of this is the electronic contract signing problem where two parties are physically apart and negotiate a contract in the form of digital document over a communication network. The contract is considered legally binding if the two parties have each other's digital signatures on the digital document. The two parties need to execute a fair exchange protocol to obtain each other's digital signatures. Other applications of fair exchange protocols include certified electronic mail delivery and electronic auctioning over internet.

Fair exchange has been studied for some time in the context of "simultaneous secret exchange" or "gradual secret releasing", see for examples, S. Even, O. Goldreich, and A. Lempel, "A randomized protocol for signing contracts", Communications of the ACM, vol. 28, pp. 637–647, June 1985; also see T. Okamoto and K. Ohta, "How to simultaneously exchange secrets by general assumptions", Proceedings of the 2nd ACM Conference on Computer and Communications Security, pp. 184–192, Fairfax, Va., November 1994. In simultaneous secret exchange schemes, it is assumed that two parties A and B each possess a secret a and b, respectively, where a and b are n bit strings. Further it is assumed that both secrets represent some value to the other party and that they are willing to trade the secrets with each other. A simultaneous secret exchange process is typically carried out as following. First, A and B exchange f(a) and g(b) for some predefined functions f( ) and g( ), with the property that A can not get b from g(b) and B can not recover a from f(a). Then, A and B release a and b bit-by-bit. For such a protocol to be useful, it must satisfy the following two requirements: correctness—the correctness of each bit given must be checked by each receiver to ensure that his/her secret has not being traded for garbage; and fairness—the computational effort required from the parties to obtain each other's remaining secret should be approximately equal at any stage during the execution of the protocol. Note that the above fairness definition based on equal computational complexity makes sense only if the two parties have equal computing power, an often unrealistic and undesirable assumption. Another drawback of the above scheme is that the execution of the scheme requires many rounds of interactions between the two parties.

The other approach in fair exchange is using an on-line trusted third party (TTP), see for examples, J. Zhou and D. Gollmann, "A fair non-repudiation protocol", Proceedings of the 1996 IEEE Symposium on Security and Privacy, IEEE Computer Press, pp. 55–61, Oakland, Calif.; R. H. Deng, L. Gong, A. A. Lazar, and W. Wang, "Practical protocols for certified electronic mail", Journal of Network and Systems Management, vil. 4, no. 3, pp. 279–297, 1996. In on-line TTP based protocols, the TTP acts as a middleman. A and B forward their messages/signatures to the TTP. The TTP first checks the validity of the received signatures and then relays them to the respective parties. The major drawback of this approach is that the TTP is always involved in the exchange even if the parties are honest and no fault occurs; therefore, the on-line TTP is both a computational bottleneck and a communications bottleneck. To avoid such bottlenecks, a more novel approach is to use protocols with an off-line TTP. That is, the TTP does not get involved in the normal or exceptionless case, it gets involved only in the presence of faults or in the case of dishonest parties who do not follow the protocols.

To our knowledge, the only fair exchange protocols using off-line TTP are given by N. Asokan, M. Schunter, and M. Waidner, "Optimistic protocols for fair exchange", Proceedings of the 4th ACM Conference on Computer and Communications Security, Zurich, April 1997. However, these protocols achieve fairness only if the TTP can undo a transfer of an item or it is able to produce a replacement for it; otherwise, a misbehaving party may get other party's data and refuse to send his data to the other party. When this happens, all the TTP can do in the above mentioned protocols is to issue affidavits attesting to what happened during the exchange. However, such affidavits may be useless in the internet environment where the cheating party may disappeared easily and the damage to the honest party may not be revocable.

In accordance with the present invention, a method of exchanging digital data between a first party, having a unique first digital data, and a second party, having a unique second digital data, over a communication link, the method comprising the steps of:

(a) the first party encrypting the first digital data and generating an authentication certificate, the authentication certificate authenticating that the encrypted first digital data is an encryption of the first digital data, and sending the encrypted first digital data and the authentication certificate to the second party;

(b) the second party verifying that the encrypted first digital data is an encryption of the first digital data using the authentication certificate, and the second party sending the second digital data to the first party if the verification is positive;

(c) the first party verifying that the second digital data is valid, and if the verification is positive the first party accepts the second digital data and sends the unencrypted first digital data to the second party;

(d) the second party verifying that the first digital data is valid, and if the verification is positive, the second party accepts the first digital data; otherwise, the second entity sends the encrypted first digital data and the second digital data to a third party, the third party having a decryption key to decrypt the encrypted first digital data; and (e) the third party decrypting the encrypted first digital data to obtain the first digital data, verifying that the first and the second digital data are valid and, if both the first and the second digital data are verified as valid, sending the first digital data to the second party and the second digital data to the first party.

The invention provides a method of exchanging digital data between distrustful parties over a communication link, and has the advantages of 1) using an off-line trusted third party (TTP), i.e., TTP does not take part in the exchange unless one of the exchanging parties behaves improperly; 2) being efficient in communications, only three message exchanges are required in the normal situation; and 3) achieving fairness, i.e., either A and B obtain each other's data or no party receives anything useful, and no loss is incurred to a party no matter how maliciously the other party behaves during the exchange.

Fairness is only achieved if the exchange protocol possesses a so called loss-preventing property. Loss-preventing means that no loss is incurred to a party no matter how improperly the other party performs. More specifically, an exchange protocol achieves true fairness if it guarantees that either both parties obtain each other's signatures or none of them get anything. The exchange systems presented in this invention are the first which achieve true fairness with off-line TTP.

A new cryptographic primitive, called the Certificate of Encrypted Message Being a Signature (CEMBS) is also invented here. The CEMBS is used to prove that an encrypted message is a certain party's signature on a file without revealing the actual signature.

Examples of a method of exchanging digital data in accordance with the invention will now be described with reference to the accompanying drawings, in which.

The parties involved in the protocols and some of the notations used in the description of the examples are as follows.

Notations Related to Public Key Encryption Scheme
p: a public key encryption scheme
Pencr: encryption algorithm of P
Pdecr: decryption algorithm of P
PK: a public key in P
SK: the private key corresponding to PK
Pencr(PK, m): encryption output (i.e., ciphertext) of a plaintext m using PK
Pdecr(SK, c): decryption output (i.e., plaintext) of a ciphertext c using SK Notations Related to Digital Signature Schemes
S: a digital signature scheme
Ssign: signing algorithm of S
Sveri: verifying algorithm of S
sk: a private (or signing) key in S
pk: the public (or verifying) key corresponding to sk
Ssign(sk, m): signature on a plaintext m under private key sk
Sveri(pk, sign, m): verification of a signature sign on a message m using public key pk; it outputs
  yes if the signature is valid and no otherwise Mathematics Notations
$a^b$: a raised to the bth power
$a\|b$: the concatenation of a and b
Zp: the set of p integers $\{0, 1, 2, \ldots, p-2, p-1\}$
Zp*: the subset of integers in Zp which are relatively prime to p There are three generic parties in a fair-exchange system, Parties Involved
A: a party involved in a fair exchange. It has a pair of public/private keys pkA and skA used for signature verification and generation, respectively.
B: a party involved in a fair exchange. It has a pair of public/private keys pkB and skB used for signature verification and generation, respectively.
T: an off-line trusted third party (TTP). It has a pair of public/private keys PKT and SKT used for encryption and decryption, respectively Remarks: the above keys of each parties are long term keys. There must be a secure binding between a party's identity and its public key. Such a binding may be in the form of a public key certificate issued by a certification authority. For references on public key encryption schemes, digital signature schemes, encryption and decryption and one-way hash functions, public key certificates, see D. E. R. Denning, Cryptography and Data Security, Addition-Wesley, Reading, Mass., 1983; W. Stallings, Network and Internetworks Security—Principles and Practice, Prentice Hall, Englewood Cliffs, N.J., 1995; and C. Kaufman, R. Perlman and M. Speciner, Network Security—Private Communication in a Public World, PTR Prentice Hall, Englewood Cliffs, N.J., 1995.

We will describe three protocols for fair exchange of digital data between distrustful parties A and B with an off-line trusted third party T. In all the protocols, we implement a new cryptographic mechanism called Certificate of Encrypted Message Being a Signature (CEMBS). A CEMBS is generated by the party who initiates a fair exchange to prove to others, in particular the other party, that an encrypted message is a certain party's signature on a known file while without revealing the signature. Let PKX/SKX be party X's public/private key pair in a public key encryption scheme and pkY/skY be party Y's public/private key pair in a digital signature scheme. Let sign_Y=Ssign(skY, M) be Y's signature on a file M under skY and C_X=Pencr(PKX, sign_Y) be the ciphertext of the encrypted signature sign_Y under X's public key PKX. Party Y can generate a CEMBS, denoted as Cert_Y_X, to prove that C_X is indeed the encryption (under PKX) of the signature sign_Y on M while without disclosing the signature. The Cert_Y_X can be verified by anyone using a public verification algorithm Veri, which on inputs Cert_Y_X, C_X, M, PKX, and pkY, output "yes" or "no".

That is, Veri(Cert_Y_X, C_X, M, PKX, pkY)=yes or no. If it is yes, then we must have C_X=Pencr(PKX, sign_Y) and Sveri(pkY, sign_Y, M)=yes for some sign_Y. In other words, if we decrypt C_X using SKX, the result is the signature on M under the key skY. It is impossible (computationally hard) to generate a Cert_Y_X such that Veri (Cert_Y_X, C_X, M, PKX, pkY)=yes without C_X=Pencr (PKX, sign_Y) and Sveri(pkY, sign_Y, M)=yes holding true for some sign_Y.

The CEMBS can be realized on cryptosystems with P=ElGamal public key encryption scheme and S=DSA-like digital signature scheme. It can also be realized on cryptosystems with P=ElGamal public key encryption scheme and S=Guillou-Quisquater digital signature scheme. Procedures on the realization and verification of CEMBA will be shown later.

In all the fair exchange protocols disclosed here we assume that 1) the parties A, B, and T have agreed on the public key encryption scheme P and the digital signature scheme S; 2) all parties know each others public keys via authenticated manners; 3) the communication links between all the parties are reliable and are confidentiality and integrity protected where necessary; and 4) party A is the one who initiates a fair exchange session.

1. Protocol 1—Fair Exchange of Digital Signatures on A Common File

Figure 1:
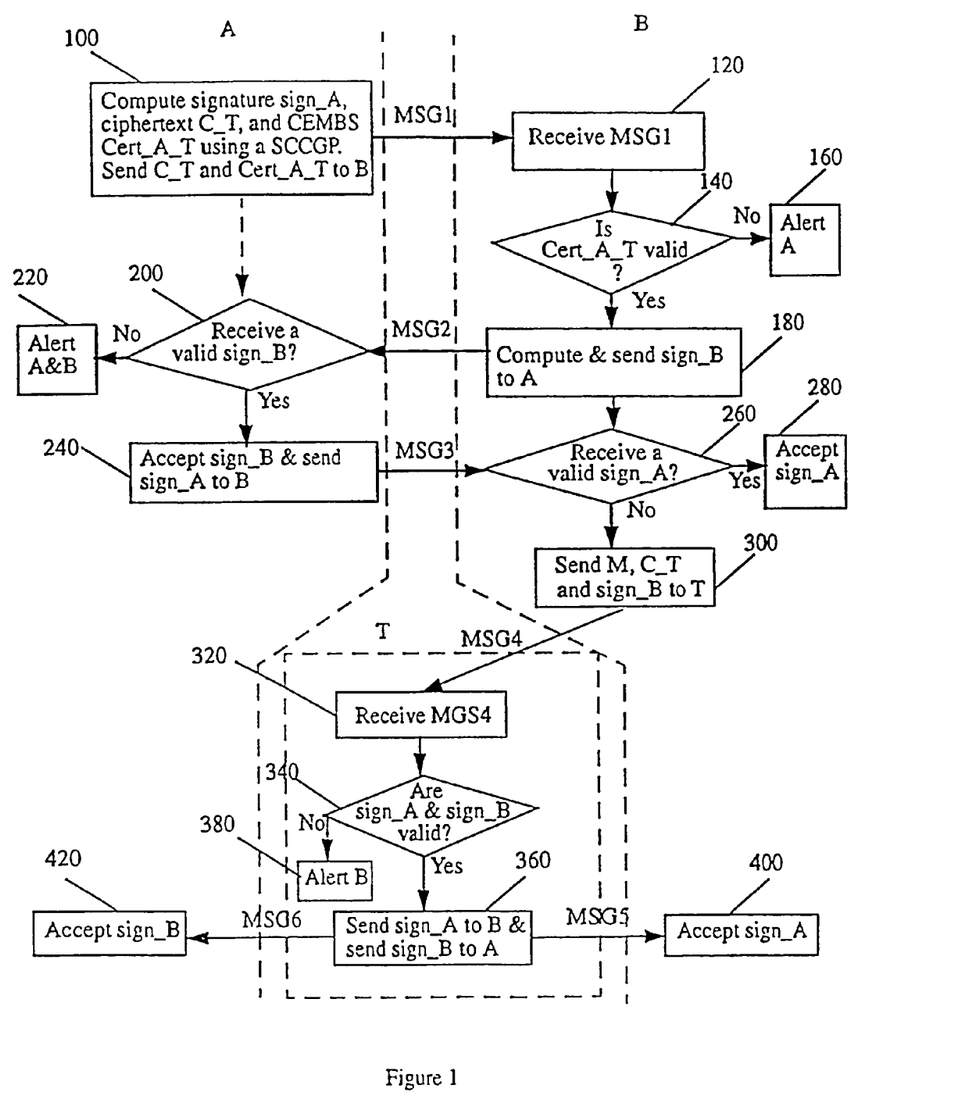
FIG. 1 shows the steps of fair exchange digital signatures on a common file.

It is assumed that A and B have agreed on a common file (such as a digital contract document) M. Referring to FIG.

1, the steps for A and B to exchange their digital signatures sign_A and sign_B on M are:

a. Party A, in step 100 using a Signature-Ciphertext-CEMBS-Generation Program (SCCGP), computes its signature sign_A=Ssign(skA, M) on the file M, the ciphertext C_T=Pencr(PKT, sign_A) on sign_A under T's public key PKT, and the CEMBS Cert_A_T which is used to prove that C_T is a ciphertext of sign_A without disclosing the signature. A sends MSG1=(C_T, Cert_A_T) to B.

b. Party B, upon receiving MSG1 in step 120, checks whether Veri (Cert_A_T, C_T, M, PKT, pkA)=yes in step 140. If the answer is "no", B does nothing or sends an alert signal to A in step 160; if it is "yes", B computes and sends his signature sign_B=S_sign(skB, M) as MSG2 to A in step 180.

c. In step 200, A checks to see if it receives MSG2 and if so, checks whether Sveri(pkB, sign_B, M)=yes. If A does not receive MSG2 or the received sign_B is not valid, A does nothing or sets up an alert signal to itself and B in step 220. If sign_B is valid, A accepts it and sends sign_A as MSG3 to B in step 240. At this point, A considers the fair exchange completed.

d. In step 260, B checks to see if it receives MSG3 and if so, checks whether Sveri(pkA, sign_A, M)=yes. If B receives MSG3 and sign_A is valid, it accepts sign_A in step 280. At this point, B considers the fair exchange completed. If B does not receive MSG3 or the received sign_A is not valid, B sends M, C_T and sign_B as MSG4 to T in step 300.

e. Upon receiving MSG4 in step 320, T in step 340 first checks sign_B using B's public key pkB to make sure that it is B's signature on M. If sign_B is correct, T decrypts C_T using its private key SKT to get sign_A and then checks whether it is A's signature on M using A's public key pkA. If both sign_A and sign_B are valid, T sends sign_A in MSG5 to B and sign_B in MSG6 to A in step 360. On the other hand, if either sign_B or sign_A is incorrect, T does nothing or send an alert signal to B in step 380.

f. Upon receiving MSG5 in step 400, B accepts sign_A and terminates the session.

g. Upon receiving MSG6 in step 420, A accepts sign_B if it has not been accepted in step 240; otherwise, A discards MSG6.

It is apparent that if A and B both behave properly, they will obtain each other's signatures without any involvement of T. Now consider what happens if B performs improperly. B has two chances to perform improperly. The first one is in step 180 where B may send A an incorrect sign_B, but A can detect this in step 200 and refuse to give sign_A to B. The second chance is right after step 120, B stops the protocol, goes to T, and asks it to decrypt C_T in order to get sign_A while without giving sign_B to A; however, according to step 340, T will send sign_A to B only if B gives correct sign_B to T. In that case, T will forward sign_B to A in step 360. Finally, let us consider what happens if A performs improperly. A may perform improperly in step 100 by giving B incorrect (C_T, Cert_A_T). However, B will detect this and stops the session. If A sends "C_T, Cert_A_T" to B such that Veri (Cert_A_T, C_T, M, PKT, pkA)=yes, then, C_T must be the ciphertext (under PKT) of A's signature on M according to the definition of CEMBS. In this case, if A performs improperly later in step 240, such as sending B an incorrect sign_A or not sending anything, B can ask T to open C_T and get A's signature on M.

2. Protocol 2—Fair Exchange of Digital Signatures on Different Files

Here we assume that A and B have agreed on two files M_A and M_B. The process for A and B to exchange their digital signatures on M_A and M_B, respectively, are identical to those in Protocol 1 except that 1) A's signature is on "M_A∥h(M_B)" and B's signature is on "M_B∥h(M_A)", i.e., sign_A=Ssign(skA, M_A∥h(M_B)) and sign_B=Ssign (skB, M_B∥h(M_A)), where ho is a one-way hash function; 2) when B asks T's help in step 300, B sends M_A, M_B, C_T, and sign_B as MSG4 to T; and 3) upon receiving MSG4 in step 320, T in step 340 decrypts C_T to get sign_A and checks to see if sign_A and sign_B are and A and B's signatures on "M_A∥h(M_B)" and "M_B∥h(M_A)", respectively.

3. Protocol 3—Fair Exchange of Confidential Data and Signature

Figure 2:
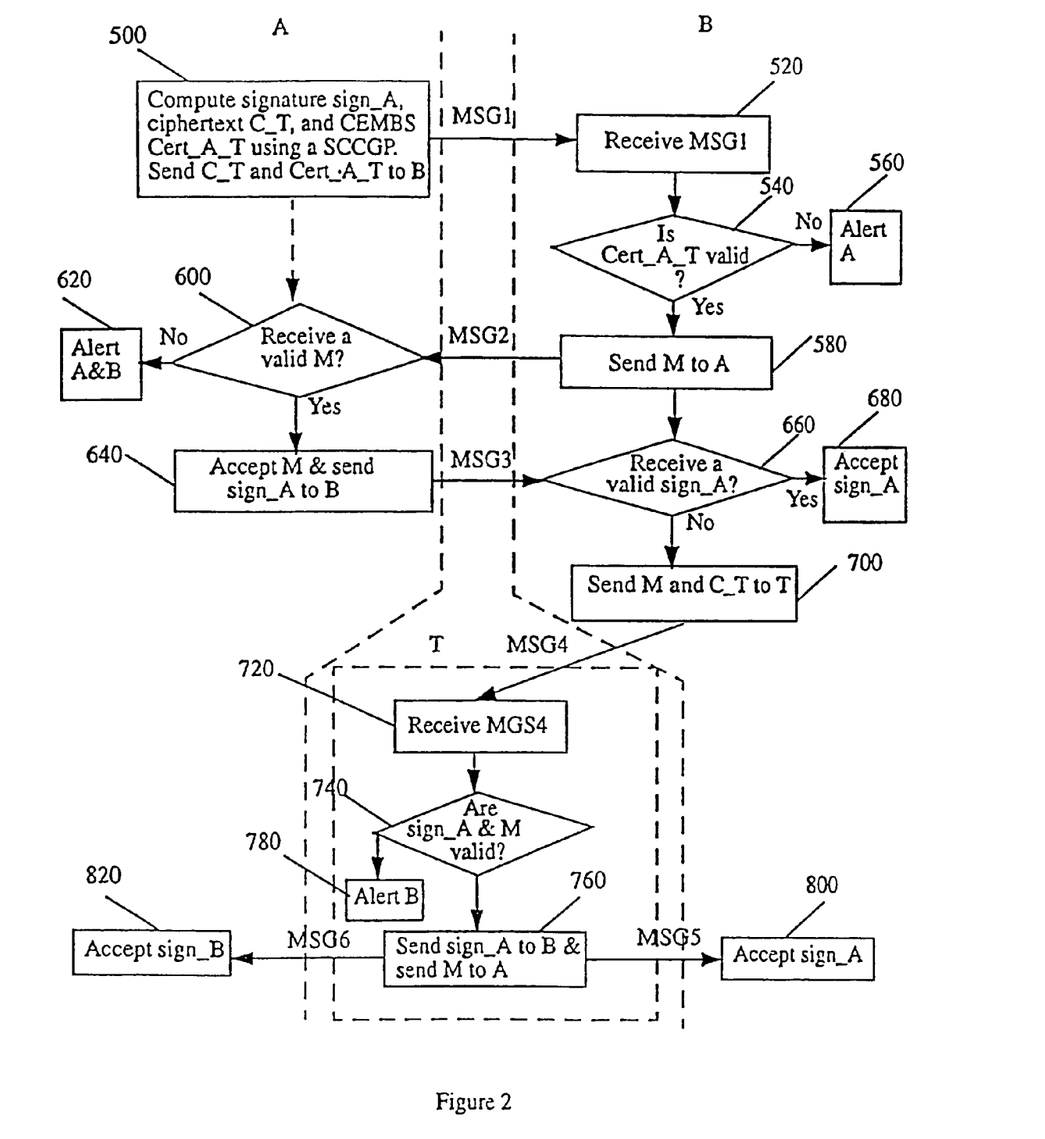
FIG. 2 shows the steps of fair exchange of a file and a digital signature on a one-way hash of the file.

FIG. 2 shows the process of exchanging a confidential message and a signature on the message between A and B. More specifically, this protocol lets A send a digital signature on a one-way hash h(M) of a file M to B in exchange for M from B. Note that A's signature is on h(M) instead of M. It is impossible for A to sign directly on M before A sees it. On the other hand, after A sees M, it may refuse to send B the signature. No protocol can solve this dilemma. To avoid A signing on h(M) but receives a message M' different from the desired M, we assume that A has means of obtaining a one-way hash of the desired message M in authenticated manners. As pointed out in M. K. Franklin and M. K. Reiter, "Fair exchange with a semi-trusted third party", Proceedings of the 4th ACM Conferences on Computer and Communications Security, pp. 1–5, Apr. 1–4, 1997, Zurich, Switzerland, this assumption is justified in protocols and applications in which one-party is responsible for revealing the input that produces a known output, already validated as part of the protocol or application, from a one-way hash function. Examples include the S/KEY user authentication system, see N. M. Haller, "The S/KEY one-time password system", Proceedings of the Internet Society Symposium on Network and Distributed Systems, 1994, the PayWord electronic payment scheme, see R. Rivest and A. Shamir, "PayWord and MicroMint—two simple micropayment schemes", RSA CryptoBytes, 1996, and applications of digital timestamping S. Haber and W. S. Stornetta, "How to time-stamp a digital document", Journal of Cryptology, 3(2), pp. 99–111, 1991.

The steps of the exchanges are:

a. Party A, in step 500 using a Signature-Ciphertext-CEMBS-Generation Program (SCCGP), computes its signature sign_A=Ssign(skA, h(M)) on the one-way hash of the desired message, the ciphertext C_T=Pencr(PKT, sign_A) on sign_A under T's public key PKT, and the CEMBS Cert_A_T which is used to prove that C_T is a ciphertext of sign_A without releasing the signature. A sends C_T and Cert_A_T as MSG1 to B.

b. B, upon receiving MSG1 in step 520, checks whether Veri(Cert_A_T, C_T, h(M), PKT, pkA)=yes in step 540. If the answer is "no", B does nothing or sends an alert signal to A step 560; if it is "yes", B sends M in MSG2 to A in step 580.

c. In step 600, A checks to see if it receives MSG2=M and if so, checks whether the one-way hash of the received message matches the known h(M). If A does not receive MSG2 or M is not valid (i.e., the one-way hash of the received message does not match h(M)), A does nothing or sets up an alert signal to itself and B in step 620. If the received M is valid, A accepts it and sends sign_A in MSG3 to B in step 640. At this point, A considers the fair exchange process completed.

d. In step 660, B checks to see if it receives MSG3 and if so, checks whether Sveri(pkA, sign_A, h(M))=yes. If B receives MSG3 and sign_A is valid, it accepts sign_A in step 680. At this point, B considers the fair exchange process completed. If B does not receive MSG3 or the received sign_A is not valid, B sends M and C_T to T in MSG4 in step 700.

e. Upon receiving MSG4 in step 720, T in step 740 first computes h(M) of the received M, decrypts C_T using its private key SKT to get sign_A and then checks whether it is A's correct signature on h(M) using A's public key pkA. If it is, T sends sign_A in MSG5 to B and sends M in MSG6 to A in step 760. On the other hand, if sign_A is not a signature on the newly computed h(M), T does nothing or send an alert signal to B in step 780.

f. Upon receiving MSG5 in step 800, B accepts sign_A and terminates the session.

g. Upon receiving MSG6 in step 820, A accepts M if it has not been accepted in step 640; otherwise, A discards MSG6.

4. The First Embodiment of the SCCGP

Figure 3:
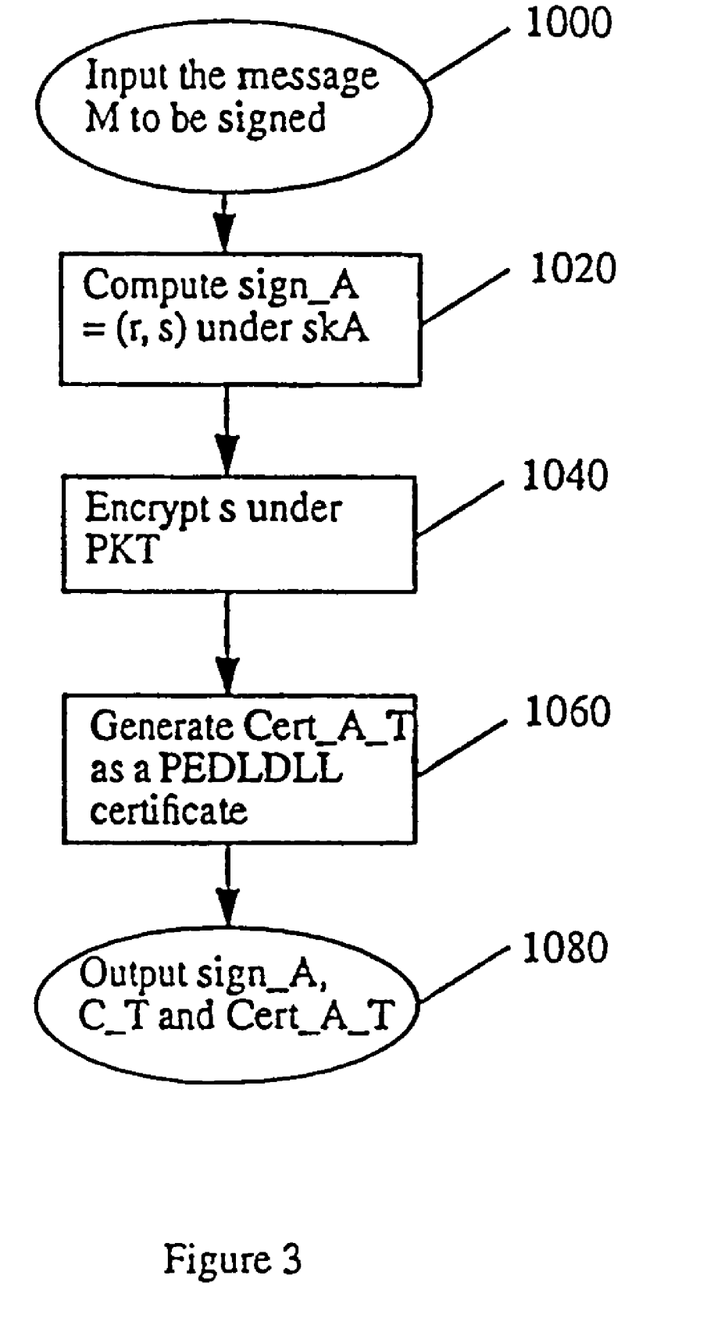
FIG. 3 illustrates the flow diagram of the first Signature-Ciphertext-CEMBS-Generation Program (SCCGP) used in the preferred embodiment of the present invention; and, FIG. 4 shows the flow diagram of the second Signature-Ciphertext-CEMBS-Generation Program (SCCGP) used in the preferred embodiment of the present invention.

FIG. 3 shows the flow chart of the first embodiment of the Signature-Ciphertext-CEMBS-Generation Program (SC-CGP). It is described for a cryptosystem where P=ElGamal public key encryption scheme and S=DSA-like digital signature scheme. For references on ElGamal scheme and DSA, see T. ElGamal, "A public key cryptosystem and a signature scheme based on discrete logarithms", IEEE Transactions on Information Theory, IT-31(4):469–472, 1985 and NIST FIPS PUB 181, Digital Signature Standard, U.S. Department of Commerce/National Institute of Standards and Technology, respectively.

Let p and q be prime integers such that p=2q+1. For security reason, we require that q−1 have no small prime factors except 2. Let G, an element in $Zp^*$, have order q and g be a generator of $Zq^*$. We have P: ElGamal public key encryption scheme on ($Zq^*$, g)
SKT: a random element in {1, 2, . . . , q−2}
PKT: g^SKT mod q The ciphertext of m, where m is an element in $Zq^*$, under PKT is C_T=Pencr(PKT, m)=(W, V) where W=g^w mod q for a random number w in {1, 2, . . . , q−2} and V=m(PKT)^W mod q. The decryption is m=V/(W^SKT) in $Zq^*$. Further, we have S: a DSA-like signature scheme on ($Zp^*$, G)
skA: an element in $Zq^*$
pkA: G^skA mod p Party A's signature on M under skA is Ssign(skA, M)=(r, s) where r=G^k mod p for an random element k in $Zq^*$ and s=(h(M)+r(skA))/k mod q. Here h( ) is a one-way hash function. The verification Sveri (pkA, (r, s), M) is to check whether r^s=(G^h(M))(pkA^r) mod p.

CEMBS in the cryptosystem described above can be realized through Stadler's PEDLDLL (Proof of Equivalence of Discrete Logarithm to Discrete LogLogarithm), see M. Stadler, "Publicly verifiable secret sharing", Proceedings of Eurocrypto '96, LNCS 1070, Springer-Verlag, pp.190–199, 1996. The PEDLDLL problem is stated as following:

Let p and q be as defined above. Let x, y and z be elements in $Zq^*$ and X and Y be elements in $Zp^*$ where the order of X is q. There exists a a in {1, 2, . . . , q−2} such that y=x^a mod q and Y=X^((z^a)) mod p. A prover, who knows a, can produce a PEDLDLL certificate to prove to a verifier that indeed y=x^a mod q and Y=X^((z^a)) mod p for some a while not revealing a and z^a. Here x, y, z, X, and Y can be regarded as public values to the verifier.

The CEMBS Cert_A_T can be induced from a PEDLDLL certificate as follows. When party A encrypts the signature sign_A=(r, s) under PKT, it only encrypts s while leaves r in plain. That is, the encrypted signature is C_T=(r, Pencr(PKT, s)) where Pencr(PKT, s)=(W, VT), with W=g^w and VT=s((PKT)^w). Hence, the encrypted message is A's signature on M implies that r^s=(G^h(M))(pkA^r) mod p, W=g^w mod q, VT=s(PKT^w) mod q It is straightforward to see that the above are equivalent to $1/W = g^{(-w)} \mod q$, $(G^{h(M)})(pkA^r) = (r^{VT})^{(PKT^{(-w)})} \mod p$, Note that here W, g, G, h(M), pkA, r, VT, and PKT are all public values. Hence, proof of the last two equations is equivalent to the PEDLDLL if we let a=−w, x=g, y=1/W, z=PKT, X=r^VT, and Y=(G^h(M))(pkA^r). Therefore, generation of CEMBS is equivalent to generation of a PEDLDLL certificate.

Referring to FIG. 3, the steps of the first embodiment of the SCCGP invention are:

a. After reading the message M from step 1000, compute party A's signature sign_A=Ssign(skA, M)=(r, s) on M under private key skA based on the DSA-like signature scheme in step 1020, where r=G^k mod p for a value k selected randomly from $Zq^*$ and s=(h(M)+r(skA))/k mod q.

b. Encrypt s under T's public key PKT to get Pencr(PKT, s)=(W, VT) using the ElGamal public key encryption scheme in step 1040, where W=g^w mod q, VT=s(PKT^w) mod q, and w being a number randomly selected from {1, 2, . . . , q−2}.

c. Generate CEMBS Cert_A_T in step 1060. The Cert_A_T is the PEDLDLL certificate with a=−w, x=g, y=1/W, z=PKT, X=r^VT, and Y=(G^h(M))(pkA^r). The PEDLDLL is generated as follows. For i=1, 2, . . . , L, randomly select wi from {1, 2, . . . , q−2}, compute txi=x^wi mod q, tXi=X^(z^wi) mod p, and c=H(x∥y∥z∥X∥Y∥tx1∥tX1∥tx2∥tX2∥ . . . ∥txL∥tXL), where Ho is a one-way hash function with L output bits c=c1c2 . . . cL, ci=0 or 1. Finally, compute R=(r1, r2, . . . , rL) where ri=wi−a(ci) mod q−1, i=1, 2, . . . , L. The PEDLDLL (or equivalently Cert_A_T) is (R, c).

d. Output sign_A, C_T=(r, Pencr(PKT, s)), and Cert_A_T in step 1080.

The verification of the PEDLDLL/Cert_A_T is to check whether c=H(x∥y∥z∥X∥Y∥u1∥U1∥u2∥U2∥ . . . ∥uL∥UL) holds true, where ui=(x^ri)(y^ci) mod q, Ui=X^(z^ri) mod p if ci=0 or Y^(z^ri) mod p if ci=1, for i=1, 2, . . . , L, and where x=g, y=1/W, z=PKT, X=r^VT, and Y=(G^h(M))(pkA^r).

5. The Second Embodiment of the SCCGP

Figure 4:
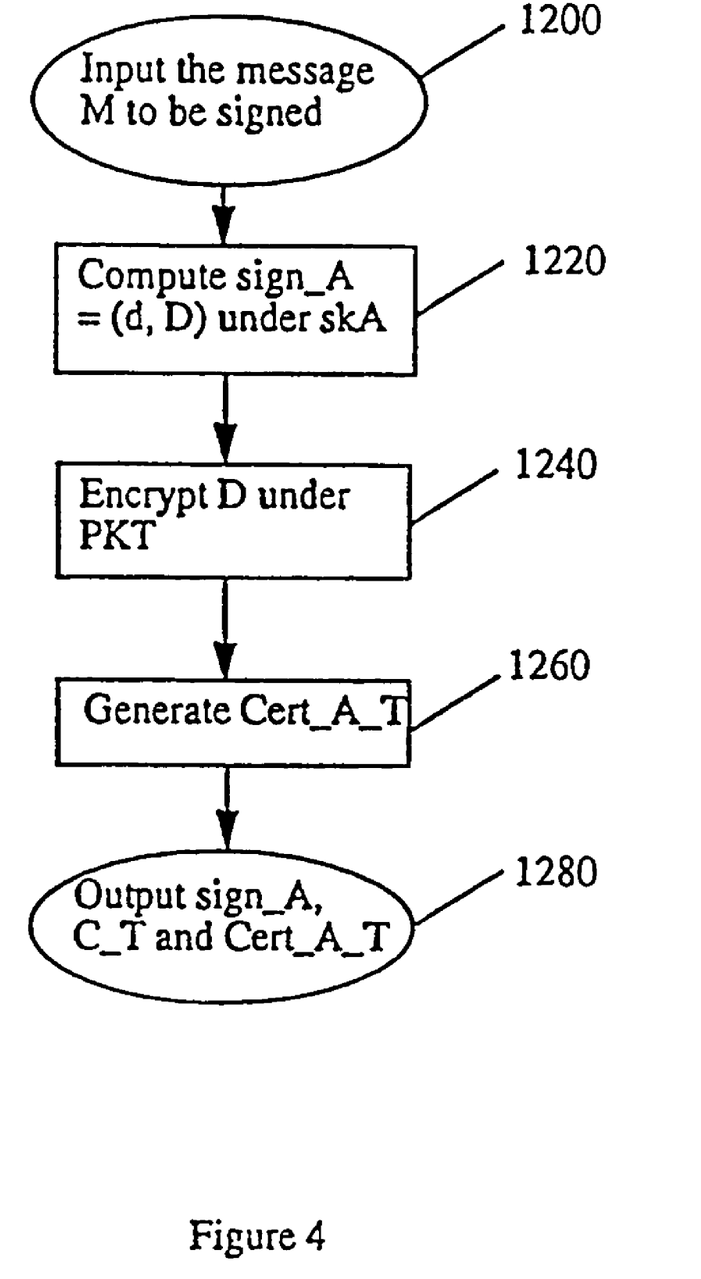

FIG. 4 shows the flow chart of the second embodiment of the Signature-Ciphertext-CEMBS-Generation Program (SCCGP) of the present invention. It is described for a cryptosystem with P=ElGamal public key encryption schene and S=Guillou-Quisquater digital signature scheme. For reference on the Guillou-Quisquater digital signature scheme, see L. C. Guillou, M. Ugon, and J. -J. Quisquater, "The Smart Card: A Standardized Security Device Dedicated to Public Cryptology", in Contemporary Cryptology—The Science of Information Integrity, edited by G. J. Simmons, IEEE Press, New York, pp.561–614, 1992.

The cryptosystem requires a trusted authorized center AC to create system parameters. AC chooses two primes R and Q where R=2p'q+1, Q=2pq+1 for primes p', p and q, sets n=RQ and chooses an element g in Zn* such that it has order q. Next, AC randomly chooses a large number v co-prime to (R−1)(Q−1) and publishes system parameters n, g, q, v. R and Q can be destroyed and AC may cease to exist after this system initialization.

The cryptosystem uses the ElGamal PKC on (Zn*, g) and the Guillou-Quisquater digital signature scheme on (Zn*,v). Specifically, we have
P: ElGamal system on (Zn*, g)
SKT: randomly selected from $\{1, 2, \ldots, q-2\}$
PKT: g^SKT mod n The ciphertext of m, an element in Zn*, under PKT is Pencr(PKT, m)=(W, V), where W=g^w mod n for a random w in $\{1, 2, \ldots, q-1\}$ and V=m(PKT) ^w mod n. The decryption is m=V/W^SKT mod n. Further, we have
S: Guillou-Quisquater signature scheme on (Zn*, v)
skA: randomly selected from Zn*
pkA: J such that J(skA) ^V=1 mod n To sign a message M, party A randomly chooses r, sets T=r^v mod n, computes d=h(M||T) and D=r(skA^d) mod n. The signature is sign_A=(d, D). The verification of the signature is to check whether d=h(M||(D^v)(pkA^d) mod n) holds.

Referring the FIG. 4, the steps of the SCCGP program are:

a. Upon imputing the message M to be signed in step 1200, compute party A's signature sign_A=(d, D) on M under private key skA in step 1220, where T=r^v mod n with r being a random number, d=h(M||T) and D=r(skA^d) mod n.

b. Encrypt D under T's public key PKT to get C_T=Pencr (PKT, D)=(W, VT) in step 1240, where W=g^w mod n, VT=D(PKT^w) mod n, and w being a number randomly selected from Zn*.

c. Generate Cert_A_T=(r, c, V, d) in step 1260, where d is from step 1200, V D^v mod n, and (r, c) are calculated as follows:

randomly choose u from $\{1, 2, \ldots, q-1\}$, compute a=g^u mod n and A=(PKT^V) ^u mod n. Then compute c=(g||W||PKT^v||(VT^v)/V||a||A) and r=u−cw mod q and where H( ) is a one-way hash function.

d. Output sign_A, C_T, and Cert_A_T in step 1280.

Note that verification of Cert_A_T is to check whether c=H(g||W||PKT^v||(VT^v)/V||(g^r)(W^c)||((PKT^v) ^r)((VT^v/V) ^c) holds true.

The invention claimed is:

1. A method of exchanging digital data over a communications link between a first party having a unique first digital data and a second party having a unique second digital data, the method comprising:
   the first party encrypting the first digital data and generating an authentication certificate, the authentication certificate authenticating that the encrypted first digital data is an encryption of the first digital data, and sending the encrypted first digital data and the authentication certificate to the second party;
   the second party verifying that the encrypted first digital data is an encryption of the first digital data using the authentication certificate, and the second party sending the second digital data to the first party when the encrypted first digital data is an encryption of the first digital data;
   the first party verifying that the second digital data is valid and, when the second digital data is valid, the first party accepting the second digital data and sending the unencrypted first digital data to the second party;
   the second party verifying that the unencrypted first digital data is valid and, when the unencrypted first digital data is valid, the second party accepting the unencrypted first digital data and, when the unencrypted first digital data is invalid, the second party sending the encrypted first digital data and the second digital data to a third party, the third party having a decryption key to decrypt the encrypted first digital data; and
   the third party receiving the encrypted first digital data and the second digital data from the second party when the unencrypted first digital data is invalid, the third party decrypting the encrypted first digital data to obtain the decrypted first digital data, verifying that the decrypted first and the second digital data are valid and, when the decrypted first and the second digital data are valid, sending the decrypted first digital data to the second party and the second digital data to the first party.

2. The method according to claim 1, in which the first and second digital data are on files M_A and M_B respectively, the first party encrypting the first digital data on a concatenation of file M_A and a one-way hash of file M_B; and, when the encrypted first digital data is an encryption of the first digital data, the second party encrypting the second digital data on a concatenation of file M_B and a one-way hash of file M_A.

3. The method according to claim 1, wherein the first and second digital data are digital signatures belonging to the first and second party, respectively.

4. The method according to claim 1, wherein the second digital data is a secret file M which the first party wishes to receive from the second party in exchange for the first digital data.

5. The method according to claim 1, wherein the first party has a pair of public/private keys in a first digital signature scheme; the second party has a pair of public/private keys in a second digital signature scheme; and the third party has a pair of public/private keys in a public key encryption scheme.

6. The method according to claim 5, wherein the digital signature schemes are discrete logarithm based schemes; and the public key encryption scheme is a discrete logarithm based scheme.

7. The method according to claim 5, wherein the digital signature schemes are Guillou-Quisquater type digital signature schemes; and the public key encryption scheme is a discrete logarithm based scheme.

8. The method according to claim 2, wherein the first and second digital data are digital signatures belonging to the first and second party, respectively.

9. The method according to claim 2, wherein the first party has a pair of public/private keys in a first digital signature scheme; the second party has a pair of public/private keys in a second digital signature scheme; and the third party has a pair of public/private keys in a public key encryption scheme.

10. The method according to claim 3, wherein the first party has a pair of public/private keys in a first digital signature scheme; the second party has a pair of public/private keys in a second digital signature scheme; and the third party has a pair of public/private keys in a public key encryption scheme.

11. The method according to claim 4, wherein the first party has a pair of public/private keys in a first digital signature scheme; the second party has a pair of public/private keys in a second digital signature scheme; and the third party has a pair of public/private keys in a public key encryption scheme.

* * * * *